United States Patent [19]

Matherne

[11] Patent Number: 4,840,650

[45] Date of Patent: Jun. 20, 1989

[54] CEILING FAN FILTER

[76] Inventor: Elmer L. Matherne, 129 Matherne St., Bourg, La. 70343

[21] Appl. No.: 211,453

[22] Filed: Jun. 24, 1988

[51] Int. Cl.$^4$ .................. B01D 46/54; B63H 1/00
[52] U.S. Cl. .................... 55/385.1; 55/467; 55/493; 55/504; 55/508; 416/62; 416/146 R
[58] Field of Search .............. 55/279, 467, 385.1, 55/385.2, 493, 504, 508; 416/62, 146 R

[56] References Cited

U.S. PATENT DOCUMENTS

| | | | |
|---|---|---|---|
| 2,720,013 | 10/1955 | Clarke | 416/146 R X |
| 3,923,482 | 12/1975 | Knab et al. | 55/467 X |
| 4,092,136 | 5/1978 | Zixabardi | 55/467 X |
| 4,422,824 | 12/1983 | Eisenhardt | 55/467 X |
| 4,737,174 | 4/1988 | Pontius | 55/493 X |
| 4,753,573 | 6/1988 | McKnight | 416/62 |

Primary Examiner—Charles Hart
Attorney, Agent, or Firm—George A. Bode; Michael L. Hoelter

[57] ABSTRACT

A ceiling fan filter comprising a housing having an air entrance and an air exit. Within the housing and intermediate the air entrance and exit is a filter medium sized to entrap airborne particles. A ceiling fan clip secures the filter to the leading edge portion of a fan blade, thereby filtering the air as it is moved by the ceiling fan.

13 Claims, 2 Drawing Sheets

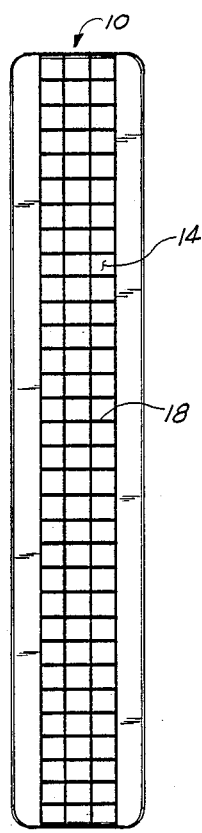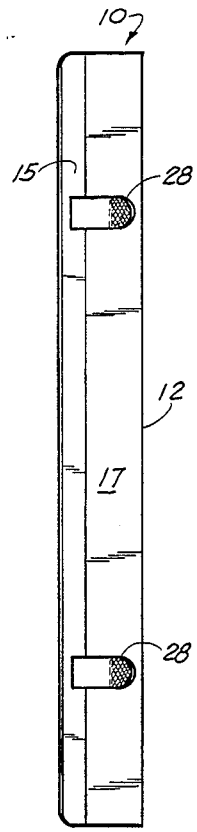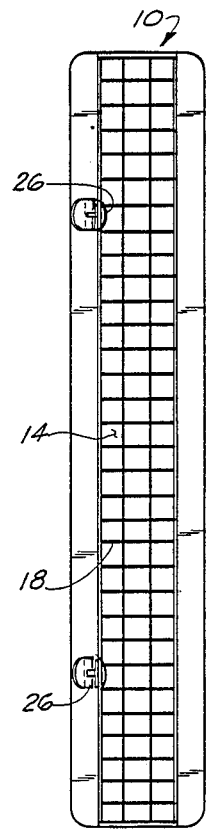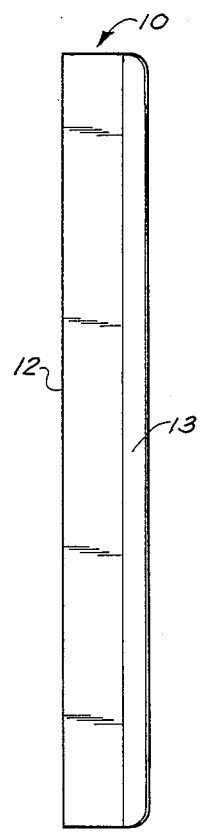
FIG. 1　　　　FIG. 2　　　　FIG. 3　　　　FIG. 4
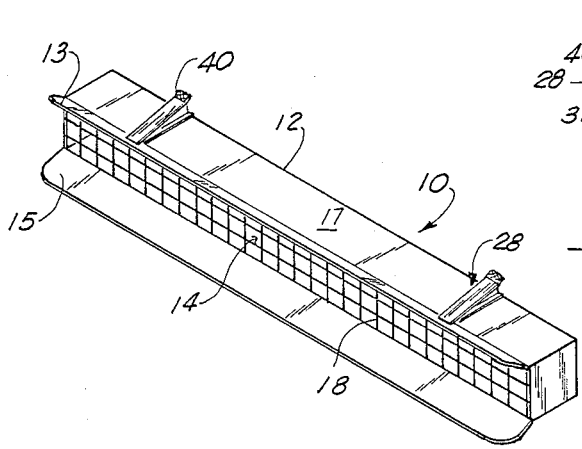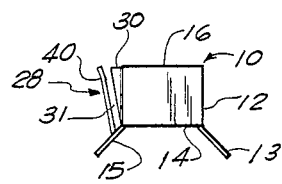
FIG. 5
FIG. 6

CEILING FAN FILTER

BACKGROUND OF THE INVENTION

1. Field of the Invention

This invention pertains to fan blade filters and more particularly, to fan blade filters that are secured to the leading edge of rotating fan blades.

2. General Background

As the use of ceiling fans grow in popularity, there becomes a greater need to filter the circulating air. In the past, when filtered air was circulated it my have been through the use of a central building unit or possibly a window air-conditioning unit, both of which filter the air entering the room. Ceiling fans, however, are not so easily adaptable to these types of filters, as it is unreasonable to build a cage around the rotating blades so as to filter the moving air.

U.S Pat. No. 3,126,263 issued to L. Schwab entitled "Gas Deflecting And Filtering" discloses a fan having filter material 46 which is rotated and through which air passes. As shown in FIG. 2, thereof, the filter material not only covers the rotating vanes, but also the space between them thereby presenting the appearance of a rotating disc. It would be impractical to cover the multiple blades of a ceiling fan with one large circular disc as described herein because to do so would destroy the circulating effect of the individual blades that makes ceiling fans desirable in the first place.

U.S. Pat. No. 3,347,025 issued to M. Wiley entitled "Air Circulation System" and U.S. Pat. No. 3,577,710 issued to E. I Feldman entitled "Air-Treatment Apparatus" both disclose fans having their air passages covered by stationary filter elements. Again, for the reasons cited above, to place a stationary filter material either above or below the rotating blades would not only be cumbersome, but would also significantly reduce the circulating effect which is so highly prized.

U.S. Pat. No. 4,422,824 issued to C. A. Eisenhardt, Jr. entitled "Germicidal Ceiling Fan Blade" discloses a ceiling fan blade having a hollow chamber into which a germicidal light is placed. Filtering pads 28 thereof are installed along the leading and trailing edges of each blade enabling air and air-borne micro-organisms to pass into the chamber. Once in the chamber, the germicidal light destroys any micro-organisms contained in the passing air. When one considers the fact that in a ceiling fan the weight of the rotating vanes is of utmost importance (they must be delicately cross balanced to avoid any irregular rotation), the weight of each vane and the likelihood of unevenly weighted vanes, makes this invention impractical for all but the stoutest of motors and sturdiest of mounts.

U.S. Pat. No. 4,596,585 issued to D. W. Moeller, et al. entitled "Method And Apparatus For Reduction Of Radon Decay Product Exposure" discloses an ion-generator suspended just below the rotating blades to create special distribution of air-borne charged ions. These ions are used to reduce the amount of the radon decay products suspended in the air.

U.S. Pat. No. 4,676,721 issued to S. D. Hardee entitled "Room Air Cleaner" and EP 196-337-A both disclose a fan whose blade surface is covered by a filter material. As the covered vanes rotate, the filter material traps air-borne particles. The operation of this patented technology is clearly understandable. The foam blocks of the European patent need to be accurately cut so as to maintain the critical balance of the rotating blades while the vane sock of Hardee '721 must be tailored to accommodate a variety of differently configured vanes.

It is thus an object of this invention to provide a practical ceiling fan filter that does not have the shortcomings mentioned hereinabove. It is a futher object of this invention to provide a ceiling fan filter that is lightweight, compact, unobtrusive, and functional.

SUMMARY OF THE PRESENT INVENTION

A ceiling fan filter comprising a hollow housing having an air entrance opening and an air exit opening. Secured within said housing is a filter medium through which air flows while passing from the entrance opening to the exist opening. This filter medium is retained in place via a stop secured to the housing, this stop being attached along a perimeter of the air entrance opening. Attachment means are secured to the housing for attaching the ceiling fan filter to a fan blade of a ceiling fan, preferably on the upper surface of the blade.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 1 is a front elevational view of the preferred embodiment of the apparatus of the present invention;

FIG. 2 is a bottom view of the embodiment of FIG. 1 showing the fastening assembly;

FIG. 3 is a rear elevational view of the embodiment of FIG. 1;

FIG. 4 is a top view of the embodiment of FIG. 1;

FIG. 5 is an end or side view of the embodiment of FIG. 1;

FIG. 6 is a bottom perspective view of the embodiment of FIG. 1 illustrating the fastening means in more detail;

DETAILED DESCRIPTION OF THE PREFERRED EMBODIMENT

Figure 7:
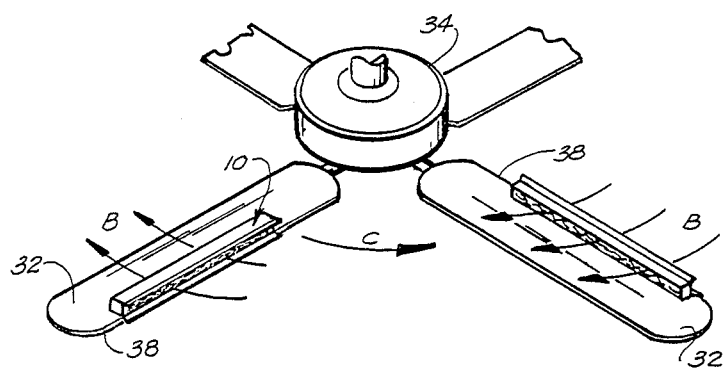
FIG. 7 is a pictorial view of the embodiment of FIG. 1 depicting its operation.

Referring initially to FIGS. 1-6, there is shown ceiling fan filter 10 having housing 12 with air entrance opening 14 and air exit opening 16. Generally, housing 12 is rectangular with its length at least three (3) times its width, and, as shown here, its depth generally equal to its width. As illustrated, the sides of housing 12 are constructed of a thin planar material and may be constructed of such diverse substances as metal, plastic or cardboard. Besides strength, one of the critical aspects of ceiling fan filter 10 is its weight which should be as light as possible. Air entrance opening 14 has provided along its upper and lower edges outwardly depending flared or angled reflectors or divertors or air channeling means 13, 15 for diverting air into entrance 14.

In this embodiment, openings 14 and 16 are positioned opposite each other and extend along the entire elongated sides of housing 12. In other embodiments, the openings may not be so elongated or they may consist of a multitude of smaller openings; it is also conceivable for the openings to be positioned adjacent and opposed each other rather than directly opposite each other so as to alter the direction of air flow through housing 12.

Front stop or screen 18 is secured along the perimeter of opening 14 and it is illustrated as being grid-like, thereby enabling air to flow through housing 12 while generally enclosing this side of housing 12. It may be constructed of a rigid, or semi-rigid, or a flexible material so long as front stop 18 performs its basic function of being a stop against which filter medium 20, best seen in FIGS. 8-10, rests. Front stop 18 may also consist of interior protrusions within housing 12 or single bars extending across air entrance opening 14.

Filter medium 20 is generally a porous mesh of randomly oriented fibers that extrap airborne particles. The mesh may be tightly woven so as to capture small particles or it may be loosely woven to only capture larger ones. In any case, filter medium 20 is porous enough to enable air to flow through it while blocking the passage of particles suspended in the air.

Figure 8:
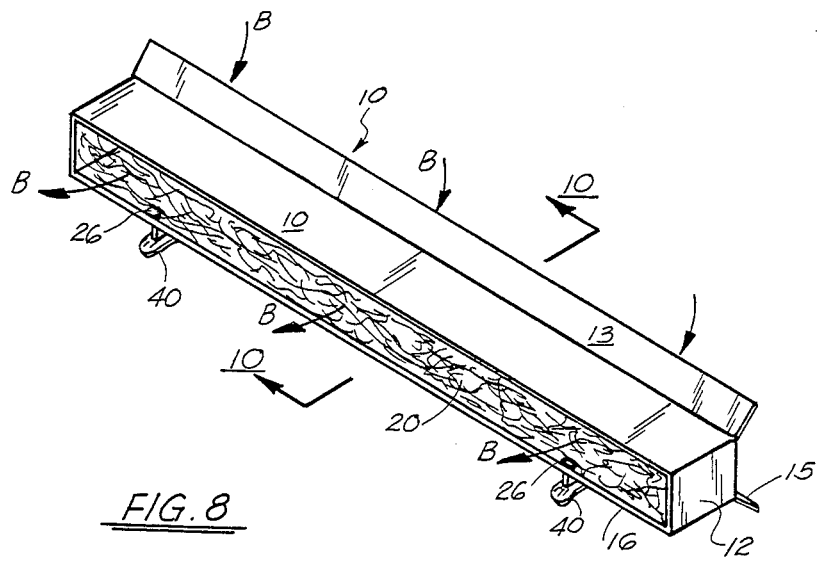
FIG. 8 is a top perspective view of the embodiment of FIG. 1 illustrating the air flow therethrough.
Figure 9:
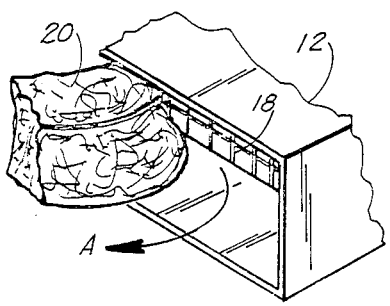
FIG. 9 is a fragmentary top perspective view of a portion of the embodiment of FIG. 1 depicting the removable filter medium; and, FIG. 10 is a cross-sectional view taken along Line 10-10 of FIG. 8.
Figure 10:
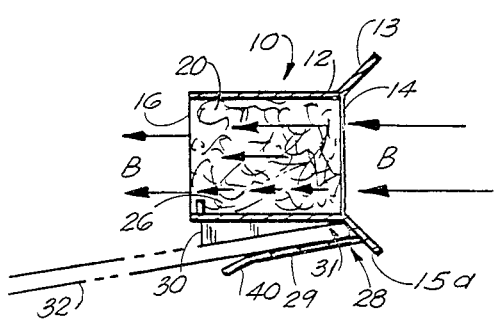

FIGS. 8, 9, and 10 clearly illustrate the positioning of filter medium 20. In the preferred embodiment, filter medium 20 consists of a rectangular block of randomly oriented fibers that is inserted within housing 12 via air exit opening 16. It is situated against front stop 18 which retains it within housing 12. Rear stops or protrusions 26 secured adjacent air exit opening 16 protrude into the interior of housing 12 and secure filter medium 20 between it and front stop 18. Rear stops 26 do not generally enclose air exit opening 16 in the same manner as front stop 18 encloses or extends across air entrance opening 14, so as to aid in the removal of filter medium 20. Filter medium 20 is removed in the opposite manner in which it was inserted (see ARROW A) for cleaning and/or replacement purposes. FIGS. 8 and 10 best illustrate the direction of air flow (see ARROWS B) through filter medium 20 and hence housing 12.

Secured along bottom surface 17 of housing 12 are a plurality (two (2) are illustrated) attachment means 28, for attaching filter 10 to ceiling fan blade 32. Means 28 are semi-rigid in construction and elongated portion 29 is angled downwardly or diverges from surface 17 from air entrance opening 14 to air exit opening 16. As best seen in FIG. 10, means 28 is connected at its proximate end to reflector or diverter 15 at diverter 15's outer surface 15a. Wedged guide 30 maintains a generally uniform gap 31 within each means or clip 28, with gap 31 being the approximate thickness of fan blades 32. The angle that gap 31 makes with respect to a horizontal line is ideally the same angle that the flat surface fan blade 32 makes with a horizontal plane. In this fashion, housing 12 and especially air entrance opening 14 would be properly oriented with respect to the air flow (ARROWS B) across the top surface of fan blade 32 (see FIG. 10).

Although attachment clips 28 are illustrative of a frictionally-tight fit between housing 12 and fan blade 32, other means of attaching the housing to the blade, such as by screws, glue, or other mechanical/chemical means, is also conceivable. An important factor when determining the means of attachment is the weight so as to affect the critical balance of the rotating fan blades as little as possible.

The operation of ceiling fan filter 10 is as follows. Filter medium 20 is flexed and inserted into housing 12 between front stop 18 and rear stop 26. Ideally filter medium 20 would fill the entire chamber within housing 12 so as to filter out air-borne particles as much as possible. Next, individual fan blade filters 10 would be positioned along the leading edge of each fan blade 32. FIG. 7 illustrates ceiling fan 34 rotating in the direction of ARROW C, consequently the leading edge of each fan blade 32 is edge 38. Air flow ARROWS B show the direction of air flow through housing 12 and across the top of fan blades 32.

To affix the filters 10 to fan blades 32, leading edges 38 are inserted within gaps 31 formed by attachment clips 28 (see FIG. 10). As shown, one edge of each clip 28 has a flared portion 40 to aid in the insertion of leading edge 38. This embodiment utilizes a frictionally-tight fit between housing 12 and blade 32 because as the blades rotate, the housings 12 are continuously pressed tighter and tighter on to leading edges 38. Should blades 32 be rotated in the opposite direction, this frictionally-tight fit would still be sufficient enough to maintain the proper position of housings 12 on blades 32. Also, during operation, should the blades become unbalanced, a quick repositioning of the housing 12 on the out-of-balanced blade can be quickly accomodated. As stated earlier, however, housings 12 can also be screwed, glued or otherwise attached to blades 32.

The final result of the use and operation of ceiling fan filter 10 is the filtering of the air moved by ceiling fans while permitting the easy removal/replacement of the filter medium 20.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A ceiling fan filter comprising:
    (a) a generally rectangular housing having an air entrance and an air exit;
    (b) stop means secured to a perimeter portion of said air entrance and extending across said air entrance;
    (c) a filter medium configured to fit within said housing against said stop and intermediate said air entrance and said air exit;
    (d) attachment means secured to said housing and adapted to be secured to the leading edge portion of a fan blade for attaching said ceiling fan filter to said fan blade of a ceiling fan, said attachment means comprising portions configured to frictionally fit onto said fan blade, said attachment means portions providing a gap for accepting said leading edge of said fan blade, said gap having generally the same angle as said fan blade has with horizontal plane; and,
    (e) elongated channel means secured adjacent said air entrance for channeling air into said air entrance.

2. The ceiling fan filter as set forth in claim 1, wherein said stop means comprises a grid extending across said air entrance.

3. The ceiling fan filter as set forth in claim 2, wherein said filter medium comprises a multitude of randomly oriented elongated fibers.

4. The ceiling fan filter as set forth in claim 1, further comprising a rear stop means secured interiorly of said housing adjacent said air exit.

5. The ceiling fan filter as set forth in claim 4, wherein said housing has a length to width ratio of at least three (3).

6. A ceiling fan filter comprising:
   (a) a generally rectangular housing having an air entrance and an air exit thereby providing an air passage through said housing;
   (b) stop means secured to a perimeter portion of said air entrance and extending across said air entrance;
   (c) a filter medium of a porous membrane configured to fit within said housing against said stop and intermediate said air entrance and said air exit;
   (d) attachment means secured to said housing and adapted to be secured to the leading edge portion of a fan blade for attaching said ceiling fan filter to said fan blade of a ceiling fan, said attachment means comprising portions configured to frictionally fit onto said fan blade, said attachment means portions providing a gap for accepting said leading edge of said fan blade, said gap having generally the same angle as said fan blade has with horizontal plane; and,
   (e) elongated channel means secured adjacent said air entrance for channeling air into said air entrance.

7. The ceiling fan filter as set forth in claim 6, wherein said channel means extend longitudinally along said elongated housing.

8. The ceiling fan filter as set forth in claim 7, further comprising support means for supporting said porous membrane within said housing.

9. The ceiling fan filter as set forth in claim 8, wherein said support means comprises a thin open mesh member extending across said first opening.

10. The ceiling fan filter as set forth in claim 9, wherein said porous membrane is removable and comprises a series of interlocking fibers.

11. The ceiling fan filter as set forth in claim 10, wherein said attachment means is angled with respect to said housing thereby orienting said ceiling fan filter along a horizontal plane.

12. The ceiling fan filter as set forth in claim 11, wherein air flows through said air entrance, through said porous membrane and out said air exit, said air entrance and exit being of generally equal areas.

13. A ceiling fan filter comprising:
   (a) a generally rectangular housing having an air entrance and an air exit on opposed faces thereof;
   (b) a pair of elongated air channeling means secured to said housing at the edge of its upper and lower surfaces adjacent said air entrance for channeling air into said air entrance;
   (c) first stop means comprising a grid secured to a perimeter portion of said air entrance and extending across said air entrance;
   (d) second stop means secured interiorly of said housing adjacent said air exit;
   (e) a filter medium configured to fit within said housing against said stop and intermediate said air entrance and said air exit, said filter medium comprising a multitude of randomly oriented elongated fibers; and,
   (f) attachment means secured to the lower surface of said housing and one of said channel means for frictionally attaching said ceiling fan filter to the leading edge portion of a fan blade of a ceiling fan, said attachment means having portions providing a gap therebetween for frictionally attaching said filter to said leading edge, said gap having generally the same angle as said fan blade has with a horizontal plane.

* * * * *